United States Patent
Nagura

(10) Patent No.: US 9,766,096 B2
(45) Date of Patent: Sep. 19, 2017

(54) ENCODER FOR PRODUCING POSITION INFORMATION USING POSITIONS OF A FIRST AND SECOND SENSOR, TILT ANGLES, PERIOD OF A PATTERN ON A SCALE

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 14/701,209

(22) Filed: Apr. 30, 2015

(65) Prior Publication Data

US 2015/0323352 A1    Nov. 12, 2015

(30) Foreign Application Priority Data

May 12, 2014 (JP) ................................ 2014-098312

(51) Int. Cl.
  *G01D 5/244* (2006.01)
  *G01D 5/347* (2006.01)
(52) U.S. Cl.
  CPC ..... *G01D 5/24485* (2013.01); *G01D 5/34715* (2013.01); *G01D 5/34792* (2013.01)
(58) Field of Classification Search
  CPC ........... G01D 5/34715; G01D 5/24485; G01D 5/34792; G01D 5/347; G01D 5/34746; G01D 5/34707; G01D 5/244; G01D 5/24471

USPC ................ 250/231.11, 231.1, 237 G, 237 R; 356/615, 616, 617, 618; 341/11, 13; 33/1 PT, 1 I, 1 N, 1 M
  See application file for complete search history.

(56) References Cited

U.S. PATENT DOCUMENTS

| | | | | |
|---|---|---|---|---|
| 2005/0073298 A1* | 4/2005 | Strasser | ............. | G01D 5/34746 324/207.23 |
| 2008/0106747 A1* | 5/2008 | Kudo | ................. | G01D 5/34792 356/616 |
| 2011/0068731 A1* | 3/2011 | Yoshida | ................. | G01D 5/266 318/640 |
| 2014/0103914 A1* | 4/2014 | Kusumi | .................... | G01D 5/38 324/207.21 |

FOREIGN PATENT DOCUMENTS

JP    06-317431 A    11/1994

* cited by examiner

*Primary Examiner* — Que T Le
*Assistant Examiner* — Jennifer Bennett
(74) *Attorney, Agent, or Firm* — Fitzpatrick, Cella, Harper & Scinto

(57) ABSTRACT

The encoder includes a scale and a sensor relatively movable in a first direction. The sensor includes first and second readers reading a first pattern. The encoder acquires a first position in a first direction by using an output signal from the first reader and acquires a second position in the first direction by using an output signal from the second reader. The encoder acquires a period of the first pattern by using the first and second positions, and acquires first and second shift amounts between the scale and the first and second readers in a second direction orthogonal to the first direction. The encoder produces position information by using the first and second positions, the period and the first and second shift amounts.

5 Claims, 10 Drawing Sheets

(12) United States Patent
US 9,766,096 B2

ENCODER FOR PRODUCING POSITION INFORMATION USING POSITIONS OF A FIRST AND SECOND SENSOR, TILT ANGLES, PERIOD OF A PATTERN ON A SCALE

BACKGROUND OF THE INVENTION

Field of the Invention

The present invention relates to an encoder that produces position information by using a scale and a sensor movable relative to each other.

Description of the Related Art

In such an encoder, a periodic pattern (hereinafter, referred to as a scale pattern) provided on a scale at a predetermined pitch in a direction of relative movement between the scale and a sensor is read by an optical, magnetic or conductive sensor to produce a periodic signal. Calculation by using this periodic signal then produces position information such as a relative position of the scale and the sensor and an absolute position thereof. Thus, any cumulated error (hereinafter, referred to as cumulated pitch error) in the direction of relative movement in a period (pitch) of the periodic pattern reduces a position detection accuracy of the encoder.

Japanese Patent Laid-open No. 06-317431 discloses an encoder including multiple detection heads disposed on a sensor and configured to read a scale pattern. The detection heads are disposed with an interval therebetween in a direction of relative movement between the scale and the detection heads. The encoder uses a measured value obtained through the detection heads to calculate a cumulated pitch error of the scale pattern. The cumulated pitch error thus calculated can be used to calibrate the encoder.

However, any alignment error, which is an error in alignment of the scale and the sensor, causes a line connecting positions at which the detection heads read the scale pattern to be tilted relative to the scale. This prevents the cumulated pitch error of the scale pattern from being accurately calculated, so that the calibration using the cumulated pitch error cannot improve the position detection accuracy of the encoder.

SUMMARY OF THE INVENTION

The present invention provides an encoder capable of providing a high position detection accuracy regardless of an alignment error present between a scale and a sensor, and an apparatus including the encoder.

The present invention provides as an aspect thereof an encoder including a scale, and a sensor. The scale and the sensor are movable relative to each other in a first direction, and the sensor is configured to read a first pattern as a periodic pattern provided to the scale to produce position information in the first direction. The sensor includes a first reader and a second reader disposed with an interval therebetween in the first direction and each configured to read the first pattern. The encoder further includes a first position acquirer configured to acquire a first position in the first direction by using an output signal from the first reader reading the first pattern and to acquire a second position in the first direction by using an output signal from the second reader reading the first pattern, a period acquirer configured to acquire a period of the first pattern by using the first and second positions, a second position acquirer configured to acquire a first shift amount that is a relative positional shift amount between the scale and the first reader in a second direction orthogonal to the first direction and acquire a second shift amount that is a relative positional shift amount between the scale and the second reader in the second direction, and a position information producer configured to produce the position information by using the first and second positions, the period and the first and second shift amounts.

The present invention provides as another aspect thereof an apparatus including a movable object, the above encoder configured to produce the position information of the movable object, and a controller configured to control movement of the movable object by using the position information.

Further features of the present invention will become apparent from the following description of exemplary embodiments with reference to the attached drawings.

DESCRIPTION OF THE EMBODIMENTS

Exemplary embodiments of the present invention will be described below in detail with reference to the accompanied drawings.

Embodiment 1

Figure 1:
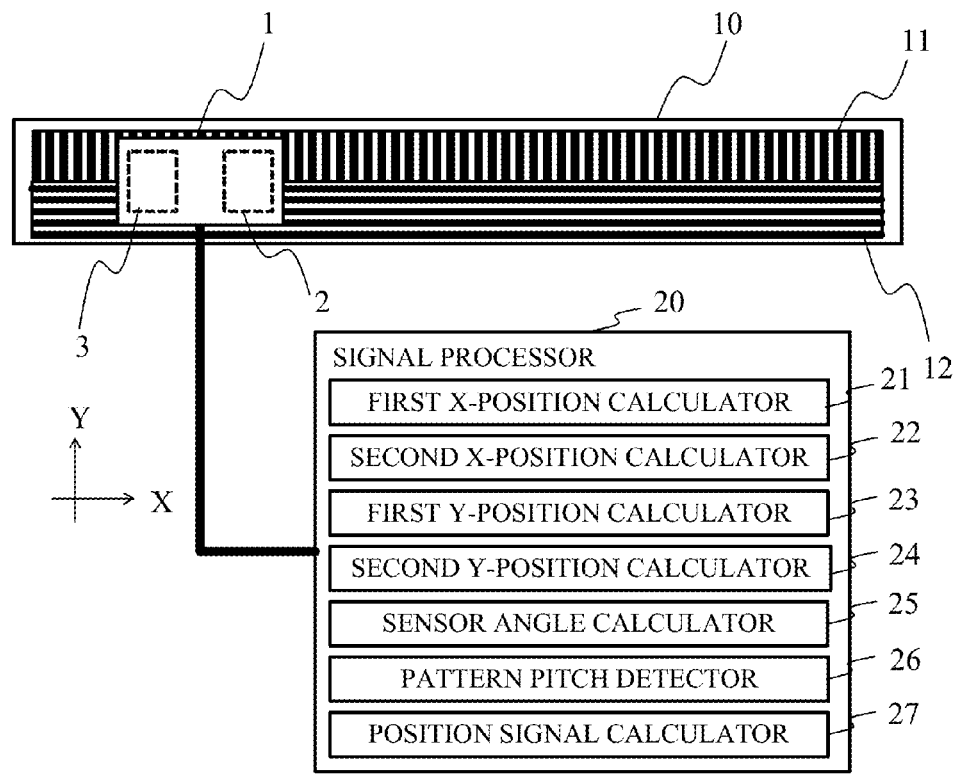
FIG. 1 illustrates a configuration of an encoder of Embodiment 1 of the present invention.

FIG. 1 illustrates a configuration of an encoder that is a first embodiment (Embodiment 1) of the present invention. The encoder includes a linear scale 10 and a sensor unit 1; the scale 10 is attached to one of an immovable (fixed) portion of an apparatus not illustrated and a movable portion that is movable relative to the immovable portion, and the sensor unit 1 is attached to the other of the immovable portion and the movable portion. Hereinafter, a direction (first direction) in which the scale 10 and the sensor unit 1 move relative to each other is referred to as "an X direction"

or "a relative movement direction". A relative positional shift and a relative tilt due to an error in attachment of the scale 10 and the sensor unit 1 is referred to as "an alignment error".

The sensor unit 1 includes a first sensor head (first reader) 2 and a second sensor head (second reader) 3. The first and second sensor heads 2 and 3 are optical reflective sensors disposed in line in the X direction (or in a direction tilted relative to the X direction when any alignment error is present) with a predetermined interval therebetweeen on the sensor unit 1.

The scale 10 is provided with an X scale pattern 11 as a first pattern. The X scale pattern 11 is a periodic pattern as a patterned portion including reflective portions and non-reflective portions which are periodically and alternately arranged in the X direction (in the direction tilted relative to the X direction when any alignment error is present). The X scale pattern 11 is used by the sensor unit 1 to detect a position in the X direction (hereinafter, referred to as "an X position").

The scale 10 is provided with a Y scale pattern 12 as a second pattern parallel to the X scale pattern 11. The Y scale pattern 12 is a periodic pattern as a patterned portion including reflective portions and non-reflective portions which are periodically and alternately arranged in a Y direction (or in a direction tilted relative to the Y direction when any alignment error is present) as a second direction orthogonal to the X direction. The Y scale pattern 12 is used by the sensor unit 1 to detect a position in the Y direction (hereinafter, referred to as "a Y position").

The first and second sensor heads 2 and 3 each optically read the X and Y scale patterns 11 and 12 and output periodic signals. The periodic signals are sent to a signal processor 20 in the sensor unit 1.

The signal processor 20 includes a first X-position calculator 21, a second X-position calculator 22, a first Y-position calculator 23, a second Y-position calculator 24, a sensor angle calculator 25, a pattern pitch detector 26 and a position signal calculator 27.

Figure 2:
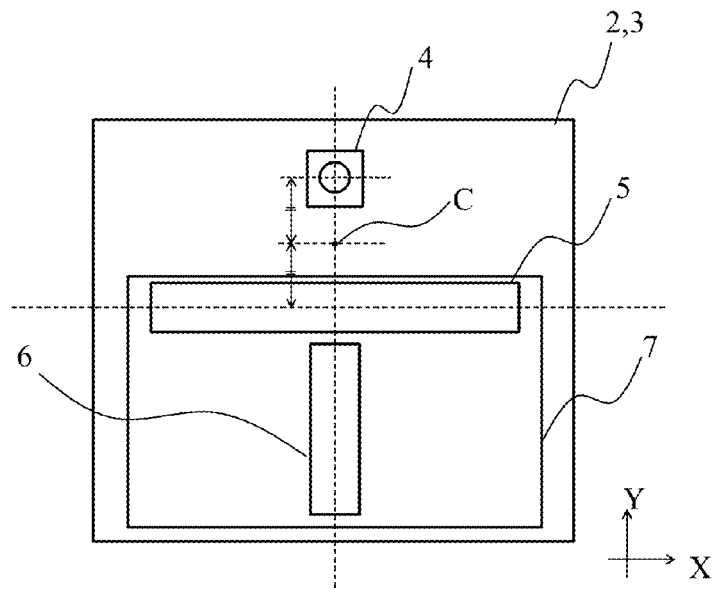
FIG. 2 illustrates a configuration of a sensor head in the encoder of Embodiment 1.

FIG. 2 illustrates a configuration common in the first and second sensor heads 2 and 3 illustrated in FIG. 1. Each sensor head includes, on its sensor surface, a light source 4 including an LED, and an X light-receiving element array 5 that receives light emitted from the light source 4 and reflected by the reflective portions of the X scale pattern 11. Each sensor also includes, on its sensor surface, a Y light-receiving element array 6 that receives light emitted from the light source 4 and reflected by the reflective portion of the Y scale pattern 12. The X light-receiving element array 5 and the Y light-receiving element array 6 are disposed on an identical semiconductor chip 7, and a relative positional relation therebetween is accurately defined.

The first and second sensor heads 2 and 3 each produce output periodic signals (output signals) for detecting the X position by using outputs from its X light-receiving element array 5 and output them to the signal processor 20; these output signals are two-phase sinusoidal signals (hereinafter, referred to as "X two-phase signals") having a phase difference of 90 degrees. The first and second sensor heads 2 and 3 further each produce output periodic signals (output signals) for detecting the Y position by using outputs from its Y light-receiving element array 6 and output them to the signal processor 20; these output signals are two-phase sinusoidal signals (hereinafter, referred to as "Y two-phase signals") having a phase difference of 90 degrees.

On the sensor surface of each sensor head, a position corresponding to a midpoint between a center of a light-emitting point of the light source 4 and a center of a light-receiving surface of the X light-receiving element array 5, in other words, a position onto which a center of a reading region irradiated with the light from the light source 4 on the scale 10 is projected on the sensor surface is hereinafter referred to as "a detection point C". The detection point C is also defined as a reading position at which each sensor head reads the X scale pattern 11 on the scale 10.

This embodiment describes each sensor head as an optical reflective sensor. Alternatively, an optical transmissive sensor or a non-optical sensor such as magnetic and conductive sensors may be used. The first X-position calculator 21 of the signal processor 20 performs arc tangent calculation on the X two-phase signals output from the first sensor head 2 to provide a current phase (hereinafter referred to as "an X phase") of these X two-phase signals. Similarly, the second X-position calculator 22 performed arc tangent calculation on the X two-phase signals output from the second sensor head 3 to provide an X phase of these X two-phase signals. The first and second X-position calculators 21 and 22 then cumulate change amounts of the X phases to calculate amounts of relative movements between the scale 10 and the respective sensor heads 2 and 3 in the X direction, that is, X detection positions. Specifically, the first and second X-position calculators 21 and 22 each calculate the X detection position by using a pitch (hereinafter referred to as "an X pattern pitch") Px that is a period of the reflective portions of the X scale pattern 11 and a cumulative phase variation amount $\Delta\Phi$ as a cumulated value of the change amount of the X phase, by using the following expression:

$$Px \times \Delta\Phi / 2\pi.$$

However, in reality, since the X pattern pitch Px includes an error (periodic error; hereinafter referred to as a pitch error), the X detection position thus calculated includes an error. The first and second X-position calculators 21 and 22 correspond to a first position acquirer.

The first Y-position calculator 23 of the signal processor 20 performs arc tangent calculation on the Y two-phase signals output from the first sensor head 2 to provide a current phase (hereinafter referred to as "a Y phase") of these Y two-phase signals. Similarly, the second Y-position calculator 24 performs arc tangent calculation on the Y two-phase signals output from the second sensor head 3 to provide a Y phase of these Y two-phase signals. The first and second Y-position calculators 23 and 24 then cumulate change amounts of the Y phases to calculate amounts of relative movements between the scale 10 and the respective sensor heads 2 and 3 in the Y direction, that is, Y detection positions. Specifically, the first and second Y-position calculators 23 and 24 each calculate the Y detection position by using a pitch (hereinafter referred to as "a Y pattern pitch") Py of the reflective portion of the Y scale pattern 12 and a cumulative phase variation amount $\Delta\Phi$ as a cumulated value of the change amount of the Y phase, by using the following expression:

$$Py \times \Delta\Phi / 2\pi.$$

The first and second Y-position calculators 23 and 24 correspond to a second position acquirer.

Next, description will be made of calculations performed by the sensor angle calculator 25, the pattern pitch detector 26 and the position signal calculator 27. The pattern pitch detector 26 corresponds to a period acquirer. The sensor angle calculator (angle acquirer) 25 and the position signal calculator 27 correspond to a position information producer.

Figure 3:
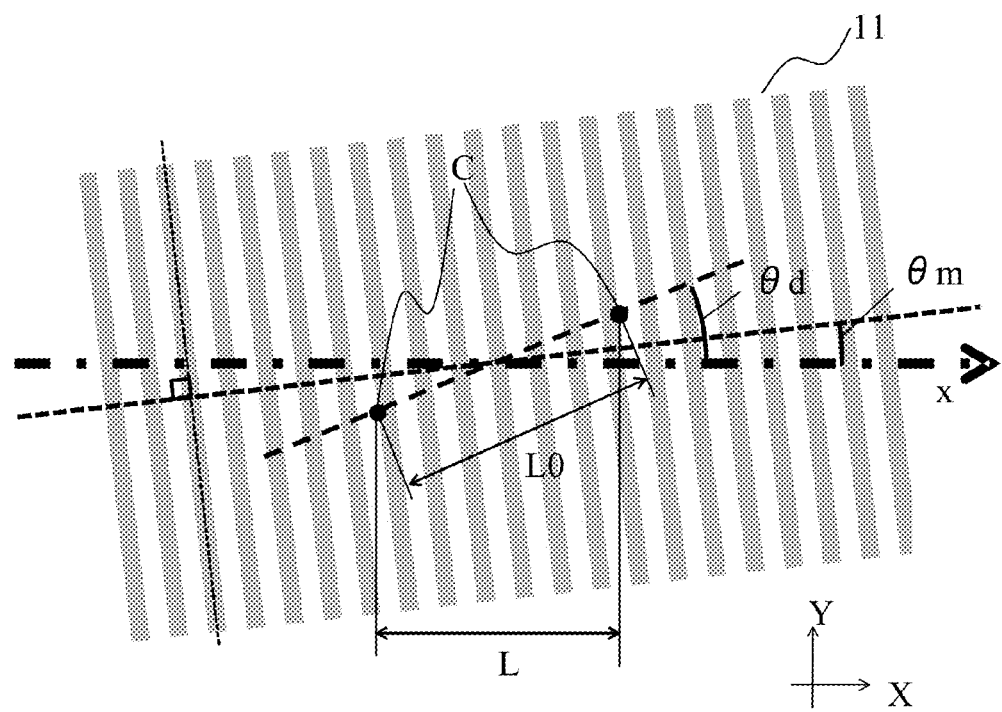
FIG. 3 illustrates an alignment error (angle error $\theta_d$) between two sensor heads and a scale pattern in the encoder of Embodiment 1.

FIG. 3 illustrates a relation among the X scale pattern 11, the detection points C of the first and second sensor heads 2 and 3 and the X direction (relative movement direction) when the scale 10 and the sensor unit 1 have an alignment error. A distance between the detection points C of the first and second sensor heads 2 and 3 in the X direction, that is, an effective detection-position distance L as an interval between positions of reading the X scale pattern 11 can be geometrically expressed by following expression (1):

$$L = L0 \cdot \frac{\cos(\theta_d - \theta_m)}{\cos(\theta_m)}. \tag{1}$$

In expression (1), L0 represents a length of a straight line (hereinafter referred to as "a detection-point line C-C") connecting the detection points C of the first and second sensor heads 2 and 3, that is, a distance between the detection points C of the first and second sensor heads 2 and 3 in a direction along the detection-point line C-C. $\theta_d$ (first tilt angle) represents a tilt angle of the detection-point line C-C relative to the X direction, and $\theta_m$ (second tilt angle) represents a tilt angle of the X scale pattern 11 relative to the X direction in a pitch direction (periodic direction).

The sensor angle calculator 25 calculates $\theta_d$ and $\theta_m$ as described below. A value A detected or calculated at an i-th (n≥i) relative movement when the scale 10 and the sensor unit 1 are relatively moved n times by a predetermined amount each is hereinafter referred to as "an i-th A" and denoted by A(i). A value B calculated from an i-th A and an (i+1)-th A is hereinafter referred to as "an i-(i+1)-th B" and denoted by B(i).

The sensor angle calculator 25 calculates $\theta_m(i)$ and $\theta_d(i)$ by using an approximation of $\theta \cong \tan\theta$ as follows.

$$\theta_m(i) = \frac{-(Ya(i+1) + Yb(i+1)) + (Ya(i) + Yb(i))}{(Xa(i+1) + Xb(i+1)) - (Xa(i) + Xb(i))} \tag{2}$$

$$\theta_d(i) - \theta_m(i) = \frac{(Ya(i+1) - Yb(i+1)) + (Ya(i) - Yb(i))}{2 \cdot L0} \tag{3}$$

$$\theta_d(i) = \frac{-(Ya(i+1) + Yb(i+1)) + (Ya(i) + Yb(i))}{(Xa(i+1) + Xb(i+1)) - (Xa(i) + Xb(i))} + \frac{(Ya(i+1) - Yb(i+1)) + (Ya(i) - Yb(i))}{2 \cdot L0} \tag{4}$$

In expressions (2) to (4), Xa(i) represents an i-th X detection position (first position) detected by the first sensor head 2, and Xb(i) represents an i-th X detection position (second position) detected by the second sensor head 3. Ya(i) represents an i-th Y detection position (first shift amount) detected by the first sensor head 2, and Yb(i) represents an i-th Y detection position (second shift amount) detected by the second sensor head 3.

The pattern pitch detector 26 calculates an i-(i+1)-th effective detection-position distance L(i) by using following expression (5):

$$L(i) = L0 \cdot \frac{\cos(\theta_d(i) - \theta_m(i))}{\cos(\theta_m(i))}. \tag{5}$$

$\theta_m(i)$ may be obtained through processing such as averaging of multiple values of an i-th $\theta_m$ (sample) in consideration of fluctuations of detected values such as Xa(i).

Since $\theta_d(i)$ typically has a minute variation dependent on the X position, a value of $\theta_d(i)$ measured at a specific X position (or in a specific X region) is applicable as a fixed value over an entire X region. Alternatively, an average value of ($\theta_d(i) - \theta_m(i)$) in a predetermined range of the X position may be substituted as a fixed value into $\theta_d(i)$, which eliminates a necessity of calculation of $\theta_m(i)$ as described later.

The pattern pitch detector 26 calculates a difference G(i) between the i-th X detection positions detected by the first and second sensor heads 2 and 3 by following expression (6):

$$G(i) = X_a(i) - X_b(i). \tag{6}$$

The pattern pitch detector 26 performs subsequent processes by regarding G(i) as a difference between the X detection positions detected by the first and second sensor heads 2 and 3 in a section from the i-th to (i+1)-th X detection positions.

Alternatively, G(i) may be calculated as an average over two i-(i+1)-th X detection positions (sample points) by using following expression (7):

$$G(i) = \frac{(X_a(i) - X_b(i)) + (X_a(i+1) - X_b(i+1))}{2}. \tag{7}$$

An average pattern pitch (average X pattern pitch) P(i) of the X scale pattern 11 in which the i-(i+1)-th effective detection-position distance L(i) is taken into account is given by following expression (8):

$$P(i) = \frac{L(i)}{G(i)} \cdot Px. \tag{8}$$

Thus, the pattern pitch detector 26 calculates a displacement amount ΔX(i) between the i-(i+1)-th sample points with errors in the X pattern pitch and the effective detection-position distance being corrected, by using following expressions (9) and (10):

$$X(i) = \frac{X_a(i) + X_b(i)}{2} \tag{9}$$

$$\Delta X(i) = (X(i+1) - X(i)) \cdot \frac{L(i)}{G(i)}. \tag{10}$$

The position signal calculator 27 calculates a cumulative displacement amount D(i) as a cumulated value of the displacement amount ΔX(i) by using following expressions:

$$D(i) = \sum_{1}^{i-1} \Delta X(i). \tag{11}$$

When $\theta_d(i)$ is regarded as a fixed value $\theta_d$, the i-th cumulative displacement amount D(i) can be approximated as follows.

$$D(i) = \left( \cos\theta_d \cdot \sum_{1}^{i} (X(i+1) - X(i)) \cdot \frac{L0}{G(i)} \right) - \Delta Y \cdot \theta_d \tag{12}$$

-continued $$Y(i) = \frac{Y_a(i) + Y_b(i)}{2} \quad (13)$$

$$\Delta Y = Y(i) - Y(1) \quad (14)$$

The signal processor 20 performs this operation of calculating the cumulative displacement amount D(i) during an initializing operation and a resetting operation of the encoder. Then, the position signal calculator 27 stores a difference between X(i+1) and D(i) as a correction value in a form of a correction table or a correction function and performs a pitch correction to add the correction value to X(i) when the X position is detected. This produces position information as a corrected X(i).

Various kinds of approximations may be applied to D(i) for a simplified process. For example, correction of non-linearity can be achieved only by setting cos $\theta_d \cong 1$ and using following expression (14) in place of expression (12).

$$D(i) = \left( \sum_{1}^{i} (X(i+1) - X(i)) \cdot \frac{L0}{G(i)} \right) + \Delta Y \cdot \theta_d \quad (15)$$

This approximation provides a practical correction accuracy. The distance L0 between the detection points C of the first and second sensor heads 2 and 3 in the direction along the detection-point line C-C may be an approximate value (for example, a designed center value).

Figure 4:
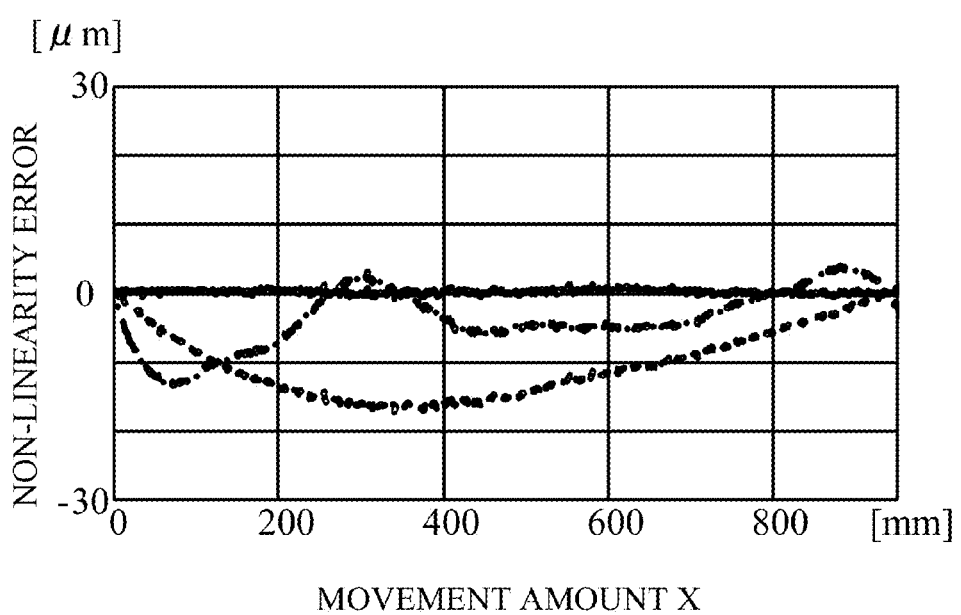
FIG. 4 illustrates a non-linear error of a scale made of plastic in the encoder of Embodiment 1.
Figure 5:
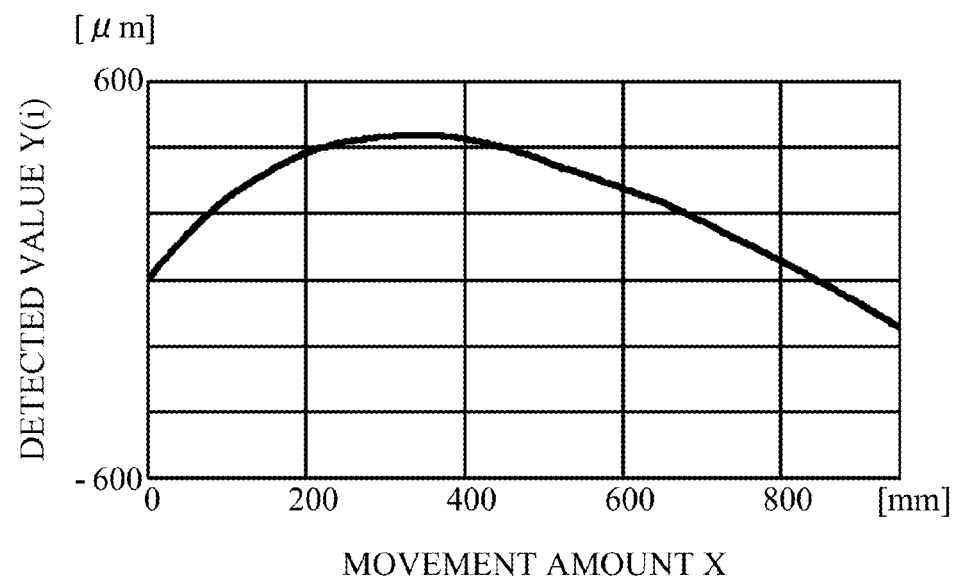
FIG. 5 illustrates a relation between a movement amount x and a detected value Y(i) in the encoder of Embodiment 1.

FIG. 4 illustrates non-linearity of an error in the X detection position for an actual relative movement amount x between a scale 10 made of plastic (resin) and the sensor unit 1 with L0=20 mm and $\theta_d = 2°$. FIG. 5 illustrates Y(i) for this relative movement amount x. In FIG. 4, a graph of a dashed line illustrates the non-linearity of the error in the X detection position when no pitch correction is performed, which is expressed by following expression (16):

$$\Delta X(i) = (X(i+1) - X(i)). \quad (16)$$

The graph indicates that a pitch error of the scale 10 causes an error with a large non-linearity.

A graph of a broken line in FIG. 4 illustrates the non-linearity of the error in the X detection position when L is set to a fixed value without the effective detection-position distance L(i) taken into account, which is expressed by following expression (17):

$$\Delta X(i) = (X(i+1) - X(i)) \cdot \frac{L0}{G(i)}. \quad (17)$$

A comparison between the graphs in FIGS. 4 and 5 indicates that a correction error is generated with displacement, that is, with meandering of the scale 10 in the Y direction.

A graph of a solid line in FIG. 4 illustrates the error in the X detection position with the effective detection-position distance L(i) taken into account as in this embodiment, which is expressed by following expression (18):

$$\Delta X(i) = (X(i+1) - X(i)) \cdot \frac{L(i)}{G(i)}. \quad (18)$$

In this case, the pitch error and meandering of the scale 10 are corrected, so that the error in the X detection position has not only a high linearity but also a small magnitude.

Coupling the first and second sensor heads 2 and 3 with each other to hold them with a low thermal expansion material such as invar can prevent the distance L0 between the detection points C from varying with temperature. When the scale 10 is expanded or contracted due to an environmental temperature change, the correction processing described above can provide the X detection position with a higher accuracy.

Moreover, precisely measuring the effective detection-position distance L enables a correction of an absolute value with a sensitivity of the detection position to the displacement amount taken into account. This can reduce influence of, for example, an attachment tilt of the scale 10, attachment tilts of the first and second sensor heads 2 and 3, a manufacturing error of the scale 10 and extension thereof due to its attachment.

This embodiment detects the tilt of the detection-point line C-C of the first and second sensor heads 2 and 3 relative to the relative movement direction of the scale 10 and sensor unit 1 and detects the displacement of the scale 10 in a scale width direction (Y direction). Then, this embodiment corrects the error in the X detection position by using these detection results. This enables a highly accurate detection of the X position (that is, a highly accurate production of the position information).

This embodiment describes an incremental encoder, but the error correction method described in this embodiment is also applicable to an absolute encoder.

Embodiment 2

Figure 6:
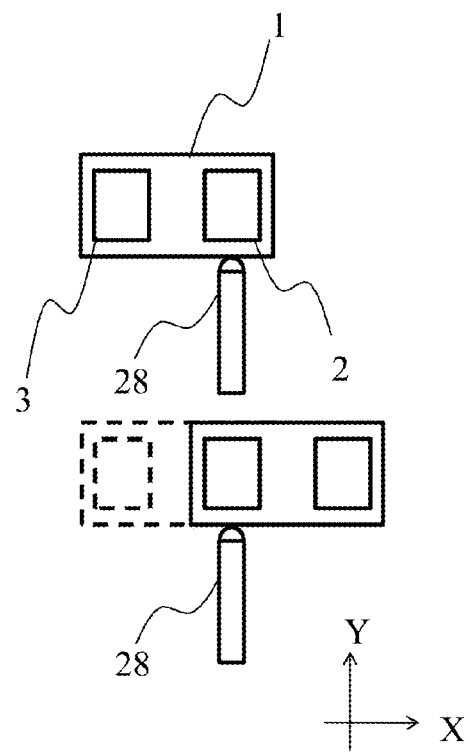
FIG. 6 illustrates a method of detecting an angle error $\theta_d$ of an encoder of Embodiment 2 of the present invention.

FIG. 6 illustrates a method of detecting $\theta_d$ (a tilt angle of a detection-point line C-C relative to an X direction) in an encoder of Embodiment 2 of the present invention. In this embodiment, common components to those of Embodiment 1 are denoted by the same reference numerals as those in Embodiment 1, and definitions in Embodiment 1 also apply to this embodiment.

In this embodiment, $\theta_d$ is detected by using a contact displacement meter (measurer) 28 fixed integrally with the scale 10. The displacement meter measures a position of a reference plane of the sensor unit 1 in the Y direction that is positioned relative to the detection points C of the first and second sensor heads 2 and 3 so as to detect $\theta_d$. The reference plane may be any plane whose positional relation relative to the detection points C of the first and second sensor heads 2 and 3 is known.

Specifically, the displacement meter 28 measures a Y-directional displacement as a difference between Y directional positions (first and second shift amounts) at two positions on the reference plane whose X positions are different from each other. Then, the sensor angle calculator 25 calculates $\theta_d$ from a magnitude of the Y displacement with respect to a distance (X-directional displacement) between the two positions in the X direction.

The pattern pitch detector 26 substitutes the $\theta_d$ thus calculated as a fixed value into $\theta_d(i)$ in expression (5). Subsequent processes are the same as those in Embodiment 1.

This embodiment requires only one of the first and second Y-position calculators 23 and 24 used in Embodiment 1.

Embodiment 3

Figure 7:
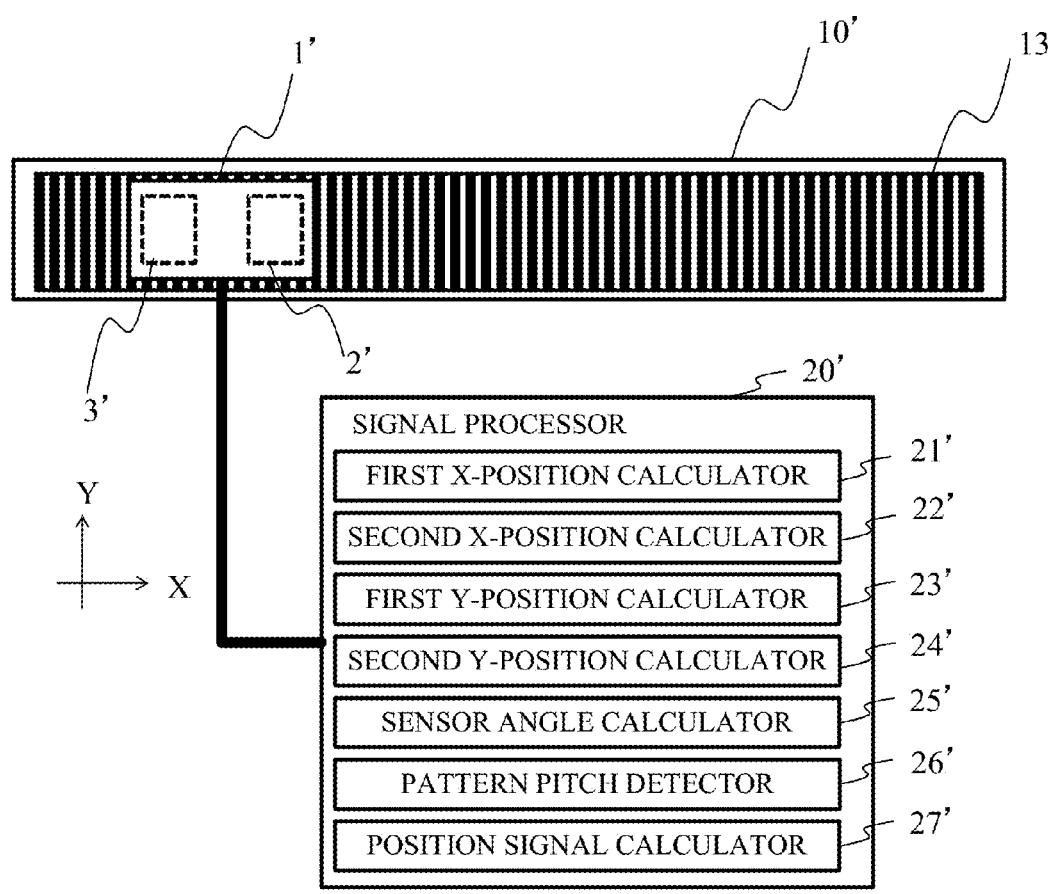
FIG. 7 illustrates a configuration of an encoder of Embodiment 3 of the present invention.

FIG. 7 illustrates a configuration of an encoder of Embodiment 3 of the present invention. The encoder in this embodiment is an absolute encoder that detects an absolute value of the X position (absolute position). The encoder includes a scale pattern 13 as a scale 10' that allows the detection of the absolute value of the X position and also allows the detection of the Y position.

Figure 8:
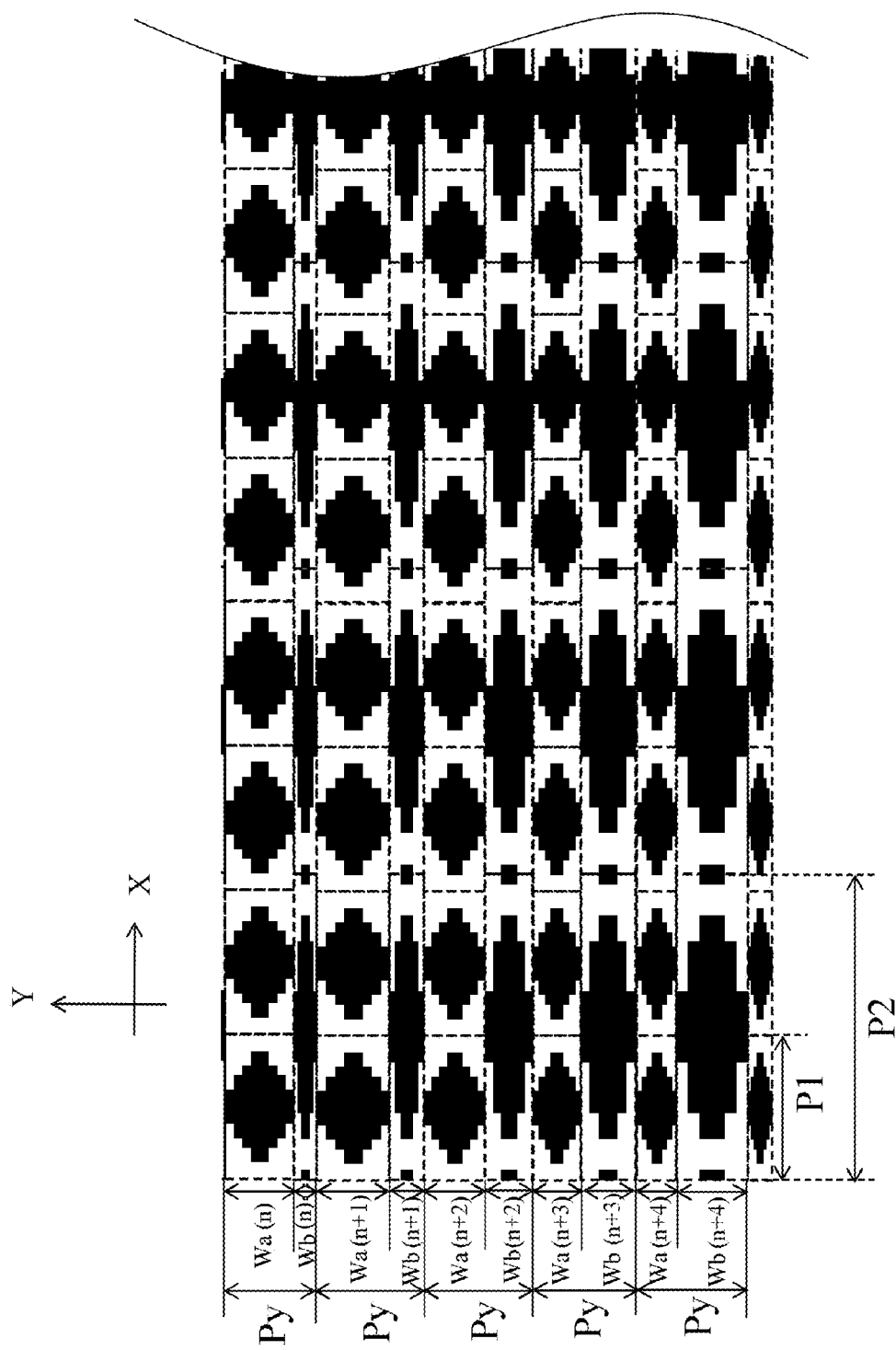
FIG. 8 is an enlarged view of part of a scale pattern in the encoder of Embodiment 3.

FIG. 8 is an enlarged view of part of the scale pattern 13. The scale pattern 13 includes two kinds of pattern regions (an X pattern region and a Y pattern region) 14 and 15 having mutually different periods in the X direction and alternately arranged in the Y direction.

Figure 9:
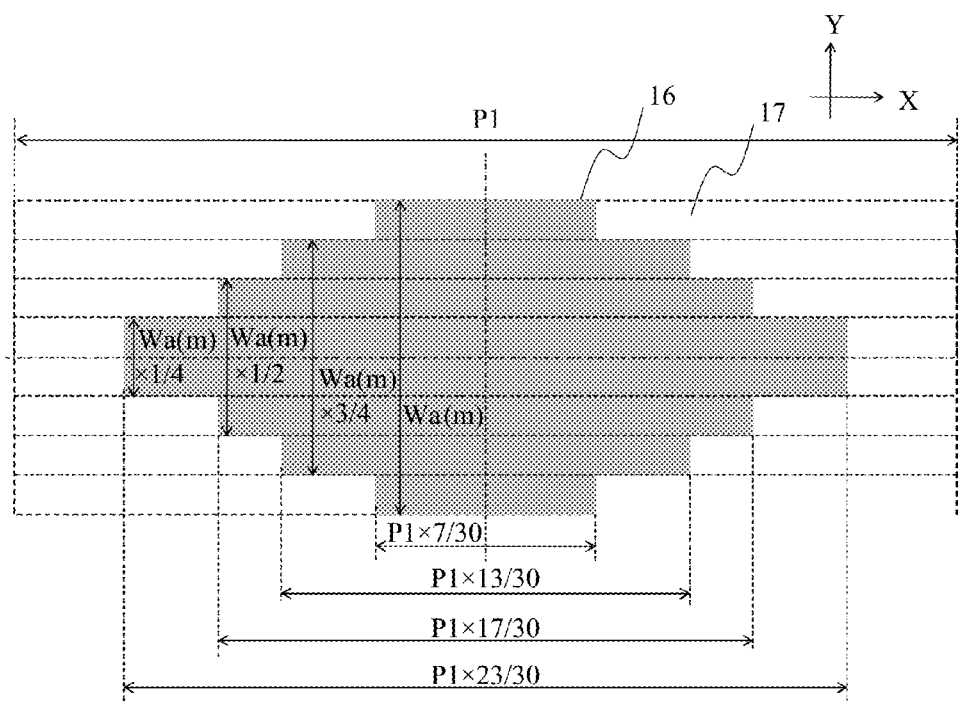
FIG. 9 is an enlarged view of a first pattern element included in the scale pattern in Embodiment 3.

FIG. 9 is an enlarged view of one period in the X direction of the X pattern region 14 provided with a first pattern. The X pattern region 14 includes a patterned portion illustrated in FIG. 9 at each X-directional pitch (first pitch) P1, and each patterned portion includes a reflective portion 16 formed of a reflective film and a non-reflective portion 17. The X pattern region 14 has a Y-directional width Wa(m), where m represents a position in the Y direction and is in a range of n to n+4.

Figure 10:
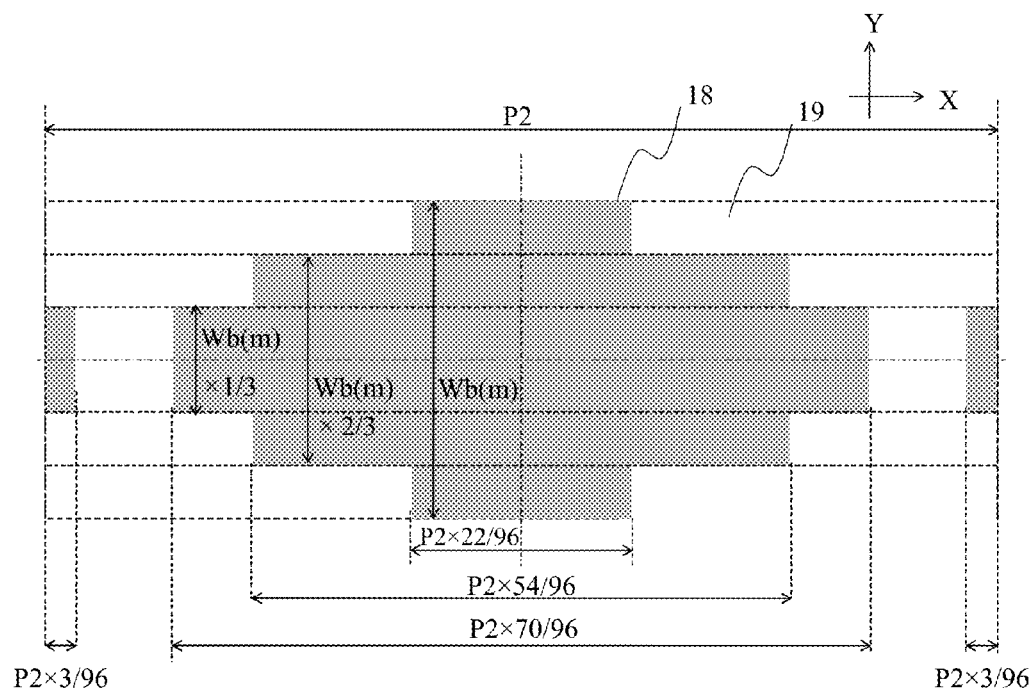
FIG. 10 is an enlarged view of a second pattern element included in the scale pattern in Embodiment 3.

FIG. 10 is an enlarged view of one period in the X direction of the Y pattern region 15 provided with a second pattern. The Y pattern region 15 includes a patterned portion illustrated in FIG. 10 at each X-directional pitch (second pitch) P2, and each patterned portion includes a reflective portion 18 formed of a reflective film and a non-reflective portion 19. The Y pattern region 15 has a Y-directional width Wb(m).

As illustrated in FIG. 8, the X and Y pattern regions 14 and 15 are formed such that a ratio of the Y-directional widths Wa(m) and Wb(m) monotonically increases (or monotonically decreases) with the position (n to n+4) in the Y direction. However, a total Y-directional width of Wa(m) and Wb(m), Py=Wa(m)+Wb(m), is constant irrespective of the position in the Y direction.

Figure 11A:
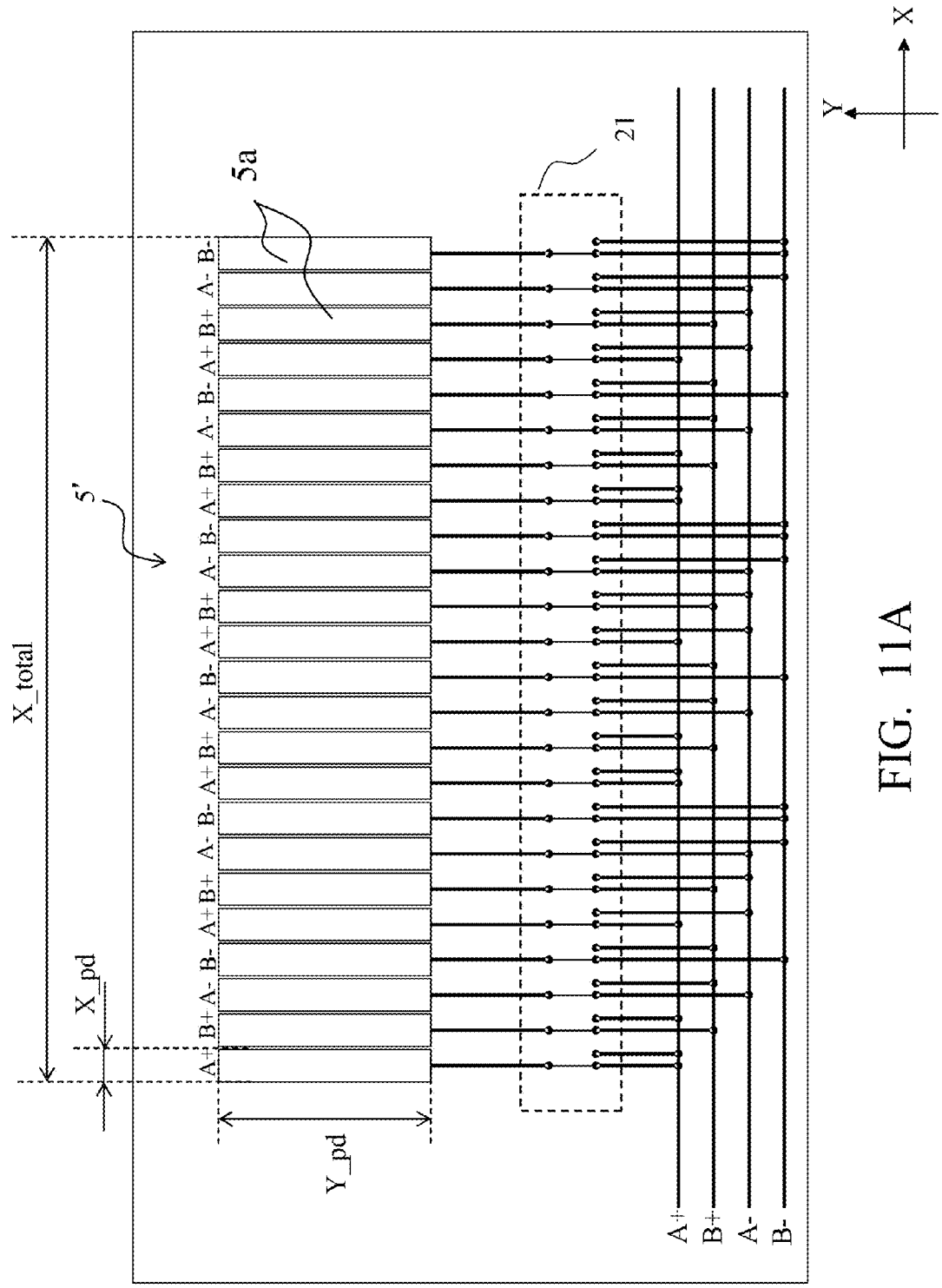
FIGS. 11A and 11B each illustrate a light-receiving element array in the encoder of Embodiment 3.
Figure 11B:
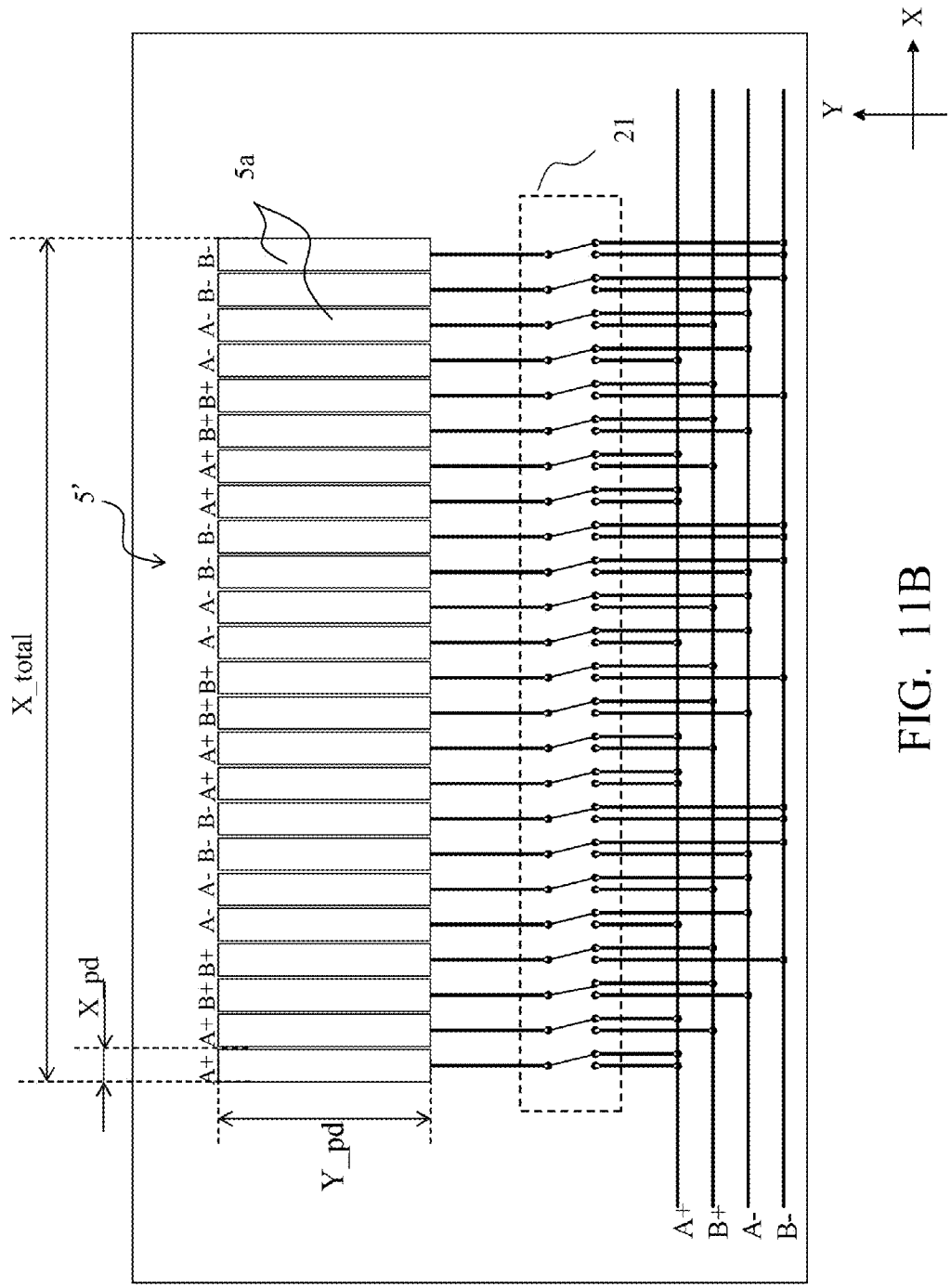

FIGS. 11A and 11B illustrate light-receiving surfaces of X light-receiving element arrays 5' provided to first and second sensor heads 2' and 3' of a sensor unit 1' in this embodiment. The X light-receiving element arrays 5' each include an array of multiple (24 in this Embodiment) of light-receiving elements 5a in the X direction. Each light-receiving element 5a has an X-directional width X pd, and the X light-receiving element array 5' (24 light-receiving elements 5a) has a total X-directional length X total. The X light-receiving element array 5' (each light-receiving element 5a) has a Y-directional width Y pd.

As illustrated in FIGS. 11A and 11B, an output of each light-receiving element 5a is selectively connected, through a switching operation of a switch circuit 21, to output terminals A+, B+, A− and B− that are connected to four first-stage amplifiers (not illustrated). The switch circuit 21 performs the switching operation in response to a switching signal from a signal processor 20'. This switches an X-directional interval between, of the 24 light-receiving elements 5a, light-receiving elements (hereinafter referred to as "added light-receiving elements") whose outputs are input to an identical output terminal (first-stage amplifier) to be added together.

Specifically, when the switching signal from the signal processor 20' is at a high level, as illustrated in FIG. 11A, the X-directional interval between the added light-receiving elements is substantially equal to the first pitch P1. In this state the X light-receiving element array 5' can detect the X pattern region 14. On the other hand, when the switching signal is at a low level, as illustrated in FIG. 11B, the X-directional interval between the added light-receiving elements is substantially equal to the second pitch P2. In this state the X light-receiving element array 5' can detect the Y pattern region 15.

The four first-stage amplifiers respectively output sinusoidal outputs S(A+), S(B+), S(A−) and S(B−) having four corresponding phases of an A+ phase, a B+ phase, an A− phase and a B− phase. Relative phases of the four-phase sinusoidal signals with respect to S(A+) are approximately +90° for S(B+), approximately +180° for S(A−) and approximately +270° for S(B−).

The signal processor 20' provides the four-phase sinusoidal outputs S(A+), S(B+), S(A−) and S(B−) with calculations using following expressions (19) and (20). This produces two-phase sinusoidal signals S(A) and S(B) in which direct-current components are removed.

$$S(A)=S(A+)-S(A-) \tag{19}$$

$$S(B)=S(B+)-S(B-) \tag{20}$$

Then, first and second X-position calculators 21' and 22' in the signal processor 20' respectively acquire phases (phase signals) Φ1 of the X pattern region 14 by calculation of following expression (21) for S(A) and S(B) obtained when the switching signal to the switch circuit 21 is at the high level. This calculates Φ1 for each of the first and second sensor heads 2' and 3'.

$$\Phi 1=\text{ATAN}2[S(A),S(B)] \tag{21}$$

In expression (21), ATAN 2[Y,X] represents an arc tangent calculation function that determines a quadrant and converts a phase to a value in a range of 0 to 2π.

Similarly, first and second Y-position calculators 23' and 24' in the signal processor 20' respectively acquire phases (phase signals) Φ2 of the Y pattern region 15 by calculation of following expression (22) for S(A) and S(B) obtained when the switching signal to the switch circuit 21 is at the low level. This calculates Φ2 for each of the first and second sensor heads 2' and 3'.

$$\Phi 2=\text{ATAN}2[S(A),S(B)] \tag{22}$$

Moreover, the first and second X-position calculators 21' and 22' respectively acquire amplitude signals amp1 by calculation of following expression (23) for S(A) and S(B) obtained when the switching signal to the switch circuit 21 is at the high level.

$$\text{amp}1=\sqrt{S(A)^2+S(B)^2} \tag{23}$$

Similarly, the first and second Y-position calculators 23' and 24' respectively acquire amplitude signals amp2 by calculation of following expression (24) for S(A) and S(B) obtained when the switching signal to the switch circuit 21 is at the low level.

$$\text{amp}2=\sqrt{S(A)^2+S(B)^2} \tag{24}$$

The switching of the switching signal to the switch circuit 21 between the high level and the low level, that is, the acquisition of the amplitude signals amp1 and amp2 with almost no time difference therebetween enables acquisition of Φ1, Φ2, amp1 and amp2 at substantially identical X positions.

The first and second X-position calculators 21' and 22' calculate, by using values of Φ1 and amp1 calculated by themselves, the X detection positions (absolute positions) Xa(i) and Xb(i) obtained by the first and second sensor heads 2' and 3'. The first and second Y-position calculators 23' and 24' calculate, by using values of ψ2 and amp2 calculated by themselves and the values of ψ1 and amp1, the Y detection positions (absolute positions) Ya(i) and Yb(i) obtained by the first and second sensor heads 2' and 3'.

A method of calculating the X detection positions by using the phase signal Φ1 and the amplitude signal amp1 calculated by the first and second X-position calculators 21' and 22' is disclosed by, for example, Japanese Patent Laid-open No. 2012-220458, and thus description thereof will be omitted.

On the other hand, the first and second Y-position calculators 23' and 24' calculate Ya(i) and Yb(i) as follows. First, the first Y-position calculator 23' calculates Ya(i) by using a ratio (amplitude ratio) of amp1a(i) as the amplitude signal amp1 and amp2a(i) as the amplitude signal amp2, the amplitude signals amp1 and amp2 being obtained by the first sensor head 2'.

$$Ya(i) = f\left(\frac{amp1a(i)}{amp2a(i)}\right) \quad (25)$$

In expression (25), f(r) represents a function that converts an amplitude ratio r into a position in the Y position, the function depending on design of the scale pattern 13.

Similarly, the second Y-position calculator 24' calculates Yb(i) by using a ratio (amplitude ratio) of amp1b(i) as the amplitude signal amp1 and amp2b(i) as the amplitude signal amp2, the amplitude signals amp1 and amp2 being obtained by the second sensor head 3'.

$$Yb(i) = f\left(\frac{amp1b(i)}{amp2b(i)}\right) \quad (26)$$

Applying Xa(i) and Xb(i), Ya(i) and Yb(i) to expressions (2) to (4) allows subsequent calculations to be performed in a similar manner to that in Embodiment 1.

This embodiment performs detections of the X and Y positions by each sensor head through the common light-receiving element array 5' and thus can highly accurately detect the tilt of the detection-point line C-C of the first and second sensor heads 2' and 3' relative to the X direction.

Embodiment 4

Figure 12:
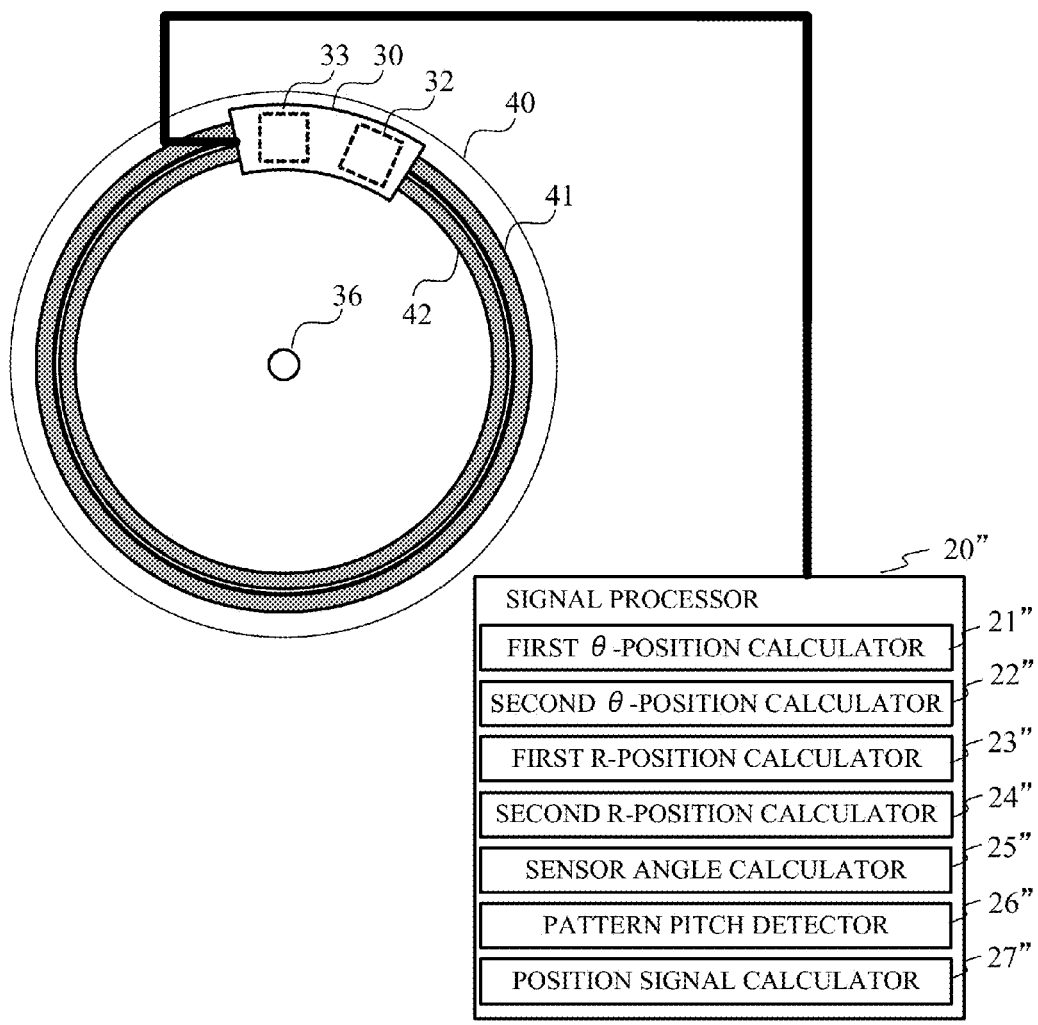
FIG. 12 illustrates a configuration of a rotary encoder of Embodiment 4 of the present invention.

FIG. 12 illustrates a configuration of a rotary encoder of Embodiment 4 of the present invention. The rotary encoder includes a disc scale 40 and a sensor unit 30. The scale 40 and the sensor unit 30 are relatively rotatable (relatively movable) around a shaft 19. The sensor unit 30 includes a first sensor head 32 and a second sensor head 33. The first and second sensor heads 32 and 33 are optical reflective sensors disposed in line with a predetermined angular interval in a circumferential direction (hereinafter referred to as "a θ direction") of the scale 40.

The scale 40 is provided with a ring θ scale pattern 41 extending in the θ direction as a first pattern. The θ scale pattern 41 is a patterned portion including reflective portions and non-reflective portions which are periodically and alternately arranged in the θ direction. The θ scale pattern 41 is used to detect a position (hereinafter referred to as "a θ position") in the θ direction. The scale 40 is provided with a ring R scale pattern 42 as a second pattern extending in the θ direction in a ring-like shape so as to be parallel to the θ scale pattern 41. The R scale pattern 42 is a patterned portion including reflective portions and non-reflective portions which are periodically and alternately arranged in a radial direction (hereinafter referred to as "an R direction") orthogonal to the θ direction. The R scale pattern 42 is used to detect a position (hereinafter referred to as "an R position") in the R direction.

Although not illustrated, the first and second sensor heads 32 and 33 each include a θ light-receiving element array and an R light-receiving element array having similar configurations to those of the X and Y light-receiving element arrays in each sensor head in Embodiment 1. The θ light-receiving element array and the R light-receiving element array respectively optically read the θ and R scale patterns 41 and 42 to output periodic signals (θ two-phase signals and R two-phase signals). The periodic signals are sent to a signal processor 20" in the sensor unit 30.

The signal processor 20" includes a first θ-position calculator 21", a second θ-position calculator 22", a first R-position calculator 23", a second R-position calculator 24", a sensor angle calculator 25", a pattern pitch detector 26" and a position signal calculator 27".

The first and second θ-position calculator 21" performs arc tangent calculation on the θ two-phase signals output from the first sensor head 32 reading the θ scale pattern 41 to provide a current phase (hereinafter referred to as "a θ phase") of these θ two-phase signals. Similarly, the second θ-position calculator 22" performs arc tangent calculation on the θ two-phase signals output from the second sensor head 33 reading the θ scale pattern 41 to provide a θ phase of these θ two-phase signals. The first and second θ-position calculators 21" and 22" then cumulate change amounts of the θ phases to calculate amounts (angles) of relative rotation of the scale 40 and the respective sensor heads 32 and 33 in the θ direction, that is, θ detection positions. Specifically, the first and second θ-position calculators 21" and 22" each calculate the θ detection position by using a pitch (hereinafter referred to as "a θ pattern pitch") Pθ of the reflective portion of the θ scale pattern 41 and a cumulative phase variation amount ΔΦ as a cumulated value of the change amount of the θ phase, by using the following expression:

$$P\theta \times \Delta\Phi / 2\pi.$$

However, in reality, since the θ pattern pitch Pθ includes an error (pitch error), the θ detection position thus calculated includes an error. The first and second θ-position calculators 21" and 22" correspond to a first position acquirer.

The first R-position calculator 23" performs arc tangent calculation on the R two-phase signals output from the first sensor head 32 reading the R scale pattern 42 to provide a current phase (hereinafter referred to as "an R phase") of these R two-phase signals. Similarly, the second R-position calculator 24" performs arc tangent calculation on the R two-phase signals output from the second sensor head 33 reading the R scale pattern 42 to provide an R phase of these R two-phase signals. The first and second R-position calculators 23" and 24" then cumulate change amounts of the R phases to calculate amounts of relative movements between the scale 40 and the respective sensor heads 32 and 33 in the R direction, that is, R detection positions. Specifically, the first and second R-position calculators 23" and 24" each calculate the R detection position by using a pitch (hereinafter referred to as "an R pattern pitch") PR of the reflective portion of the R scale pattern 42 and a cumulative phase variation amount ΔΦ as a cumulated value of the change amounts of the R phase, by using following expression:

$$PR \times \Delta\Phi / 2\pi.$$

The first and second R-position calculators 23'' and 24'' correspond to a second position acquirer.

Next, description will be made of calculations by the sensor angle calculator 25'', the pattern pitch detector 26'' and the position signal calculator 27''. The pattern pitch detector 26'' corresponds to a period acquirer. The sensor angle calculator (angle acquirer) 25'' and the position signal calculator 27'' correspond to a position information producer.

The sensor angle calculator 25'' calculates a difference H(i) between i-th θ detection positions detected by the first and second sensor heads 32 and 33, by using following expression (27):

$$H(i) = \theta_a(i) - \theta_b(i). \tag{27}$$

The sensor angle calculator 25'' performs subsequent processes by regarding H(i) as a difference between the θ detection positions detected by the first and second sensor heads 32 and 33 in a section from the i-th to (i+1)-th θ detection positions.

In the expression, $\theta_a(i)$ represents the i-th θ detection position detected by the first sensor head 32, and $\theta_b(i)$ represents the i-th θ detection position detected by the second sensor head 33.

H(i) may be calculated as an average over two i–(i+1)-th θ detection positions (sample points) by using following expression (28):

$$H(i) = \frac{(\theta_a(i) - \theta_b(i)) + (\theta_a(i+1) - \theta_b(i+1))}{2}. \tag{28}$$

When a direction in which a tangent line to the θ direction extends is referred to as "a tangent direction", a tilt angle of a detection-point line C-C connecting detection points C of the first and second sensor heads 32 and 33 relative to the tangent direction is referred to as e, With these notations, the sensor angle calculator 25'' calculates an i–(i+1)-th $\theta_d(i)$ by using following expression (29):

$$\theta_d(i) = \frac{-(Ra(i+1) + Rb(i+1)) + (Ra(i) + Rb(i))}{(\theta a(i+1) + \theta b(i+1)) - (\theta a(i) + \theta b(i))} + \frac{(Ra(i+1) - Rb(i+1)) + (Ra(i) - Rb(i))}{2 \cdot \phi 0 \cdot R0}. \tag{29}$$

In expression (29), Ra(i) represents an i-th R detection position detected by the first sensor head 32, and Rb(i) represents an i-th R detection position detected by the second sensor head 33. R0 represents an average value of (Ra(i)+Rb(i))/2 over one relative rotation of the scale 40 and the sensor 30. Moreover, φ0 [rad] represents an effective detection-position angle as an angle interval between the detection points C of the first and second sensor heads 32 and 33, and is an average value of H(i) over the one relative rotation.

The first term in expression (29) may be omitted to have following expression (30):

$$\theta_d(i) = \frac{(Ra(i+1) - Rb(i+1)) + (Ra(i) - Rb(i))}{2 \cdot \phi 0 \cdot R0}. \tag{30}$$

Since $\theta_d(i)$ typically has a minute variation dependent on the θ position, a value measured at a specific θ position (or a specific θ region) is applicable as a fixed value $\theta_d$ of $\theta_d(i)$ over an entire θ region.

The pattern pitch detector 26'' calculates a displacement amount Δθ(i) between the i–(i+1)-th sample points with errors in the θ pattern pitch and the effective detection-position angle being corrected, by using following expressions (31) and (32):

$$\theta(i) = \frac{\theta_a(i) + \theta_b(i)}{2} \tag{31}$$

$$\Delta\theta(i) = (\theta(i+1) - \theta(i)) \cdot \frac{\phi 0}{H(i)}. \tag{32}$$

The position signal calculator 27'' calculates a cumulative displacement amount D(i) as a cumulated value of the displacement amount Δθ(i) by using following expression (33):

$$D(i) = \sum_{1}^{i-1} \Delta\theta(i). \tag{33}$$

When $\theta_d$ (i) is regarded as a fixed value $\theta_d$, the i-th cumulative displacement amount D(i) can be approximated as follows.

$$D(i) = \left(\sum_{1}^{i}(\theta(i+1) - \theta(i)) \cdot \frac{\phi 0}{H(i)}\right) - \Delta R \cdot \theta_d \tag{34}$$

$$R(i) = \frac{R_a(i) + R_b(i)}{2} \tag{35}$$

$$\Delta R = R(i) - R(1) \tag{36}$$

The signal processor 20'' performs this operation of calculating the cumulative displacement amount D(i) during an initializing operation and a resetting operation of the encoder. Then, the position signal calculator 27'' stores a difference between θ(i+1) and D(i) as a correction value in a form of a correction table or a correction function and performs a pitch correction to add the correction value to θ(i) when the X position is detected. This produces position information as a corrected θ(i).

Figure 13:
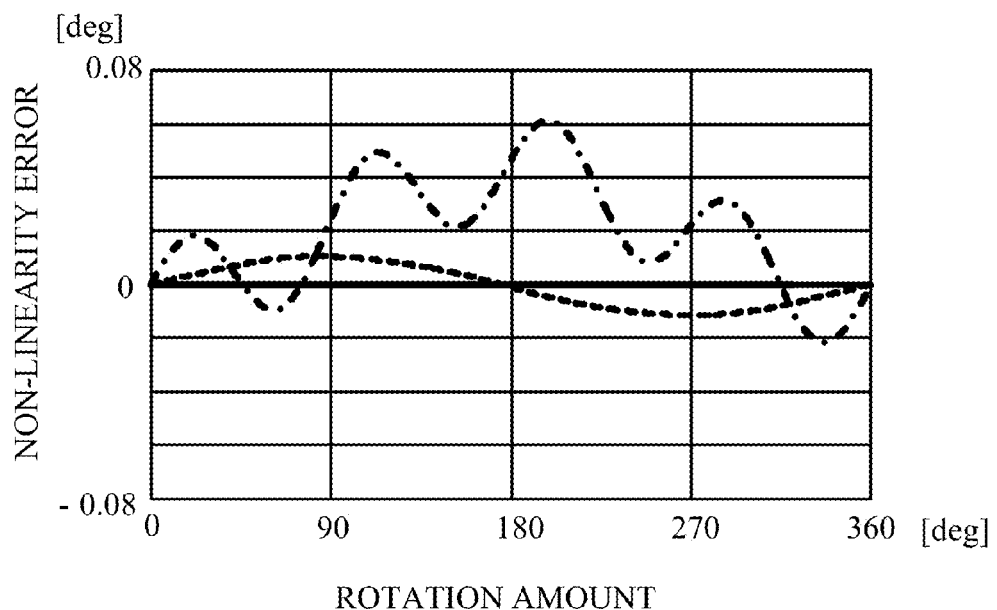
FIG. 13 illustrates a non-linear error of the rotary encoder of Embodiment 4.

FIG. 13 illustrates non-linearity of an error in the θ detection position for an amount [deg] of an actual relative rotation between the scale 40 and the sensor unit 30 when φ0 is 5 degrees, $\theta_d$ is −0.47 degrees and the pitch error of the scale 40 is 0.04 degrees (variation period is 180 degrees). An eccentric amount Ecc as a displacement amount (first or second shift amount) between the scale 40 and the sensor unit 30 in the R direction is 20 μm.

In FIG. 13, a graph of a dashed line illustrates the non-linearity of the error in the θ detection position when no pitch correction is performed, which is expressed by following expression (37):

$$D(i) = \sum_{1}^{i}(\theta(i+1) - \theta(i)). \tag{37}$$

The graph indicates that the displacement amount (eccentric amount Ecc) in the R direction causes a pitch error apparently larger than an actual pitch error of the scale 40 and thereby causes an error with a large non-linearity.

A graph of a broken line in FIG. 13 illustrates the non-linearity of the error in the θ detection position when φ0 is set to a fixed value without the effective detection-position angle taken into account, which is expressed by following expression (38):

$$D(i) = \left( \sum_{1}^{i} (\theta(i+1) - \theta(i)) \cdot \frac{\phi 0}{H(i)} \right). \quad (38)$$

The graph indicates that a correction error is generated with the displacement amount (eccentric amount Ecc) in the R direction.

A graph of a solid line (straight line at 0 degree) in FIG. 13 illustrates the error in the θ detection position with the effective detection-position angle taken into account as in this embodiment, which is expressed by following expression (39):

$$D(i) = \left( \sum_{1}^{i} (\theta(i+1) - \theta(i)) \cdot \frac{\phi 0}{H(i)} \right) - \Delta R \cdot \theta_d. \quad (39)$$

In this case, the pitch error, the decentering amount and the displacement in the R direction of the scale 40 are corrected, so that the error in the θ detection position has not only a high linearity but also a small magnitude.

This embodiment detects the tilt of the detection-point line C-C of the first and second sensor heads 32 and 33 relative to the tangent direction to the relative movement direction (θ direction) of the scale 40 and the sensor unit 30 and detects the displacement of the scale 10 in the R direction. Then, this embodiment corrects the error in the θ detection position by using these detection results. This enables a highly accurate detection of the θ position.

This embodiment describes an incremental encoder, but the error correction method described in this embodiment is also applicable to an absolute encoder.

Embodiment 5

Figure 14:
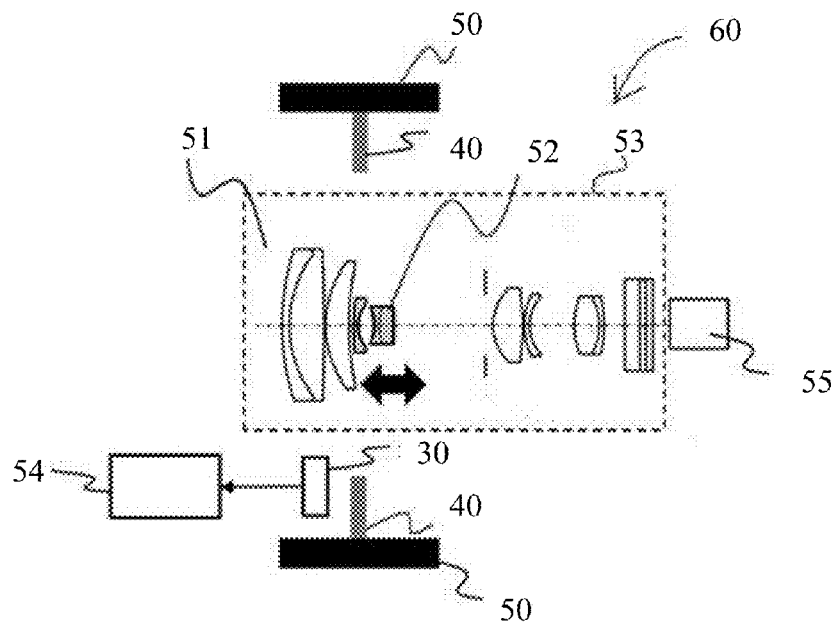
FIG. 14 illustrates a configuration of an image pickup apparatus of Embodiment 5 of the present invention.

Next, description will be made of, with reference to FIG. 14, a configuration of an image pickup apparatus 60 as an optical apparatus of Embodiment 5 of the present invention. The image pickup apparatus 60 includes the encoder of Embodiment 4 mounted on an image pickup lens unit 51. The image pickup lens unit 51 may be provided integrally with a body of the image pickup apparatus including an image sensor 55 such as a CCD sensor or a CMOS sensor, or may be of an interchange image pickup lens unit detachably attached to the body.

The encoder includes the sensor unit 30 and the ring scale 40 described in Embodiment 4, and a CPU including the signal processor 20" described in Embodiment 4. The CPU 54 serves also as a controller that performs an entire control of the image pickup apparatus 60.

In the image pickup lens unit 51, reference numeral 52 denotes a movable lens that is movable in an optical axis direction, and reference numeral 50 denotes a cylinder (movable portion) that is rotatable around an optical axis relative to a lens barrel body (unmoved portion) 53 of the image pickup lens unit 51. The scale 40 is attached to an inner circumferential portion of the cylinder 50 and is rotatable relative to the sensor unit 30 fixed to the lens barrel body 53. The movable lens 52 is, for example, a focus lens as a movable object whose position (movement) in the optical axis direction in autofocus is controlled. The movable lens 52 only needs to be a lens, such as a magnification-varying lens, whose position (movement) in the optical axis direction is controlled.

The cylinder 50 is coupled to an actuator (not illustrated) to move the movable lens 52 in the optical axis direction. The encoder detects a rotational amount (movement amount) of the cylinder 50 (that is, of the scale 40) around the optical axis. This allows the CPU 54 to detect the position of the movable lens 52 in the optical axis direction. The CPU controls drive of the actuator so as to move the movable lens 52, whose position is detected, to a position calculated as an in-focus position or the like.

The ring scale 40 may be replaced with one of the linear scales 10 and 10' of Embodiments 1 and 3 formed of film substrates, which are bent in arcs and fixed on the inner circumferential portion of the cylinder 50.

The encoder of each of the embodiments is applicable not only to the optical apparatus described in this embodiment but also to various kinds of apparatuses. For example, in a machining apparatus including a movable object such as a robotic arm and a conveyer for conveying workpieces, a position of the movable object may be detected by using the encoder of each of the embodiments, and movement thereof may be controlled. This achieves a machining apparatus capable of highly accurate machining of workpieces.

Moreover, the encoder of each of the embodiments is not largely influenced by the alignment error of the scale and the sensor unit, and is capable of performing a highly accurate position detection. This enables various kinds of apparatuses to perform highly accurate position detection and movement control of a movable object.

Each of the embodiments provides an encoder having a high position detection accuracy regardless of an alignment error present between its scale and sensor. The encoder can be used to achieve various kinds of apparatuses capable of highly accurately controlling movement of a movable object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-098312, filed on May 12, 2014, which is hereby incorporated by reference wherein in its entirety.

What is claimed is:

1. An encoder comprising:
   a scale; and
   a sensor, the scale and the sensor being movable relative to each other in a first direction, the sensor being configured to read a first pattern as a periodic pattern provided to the scale to produce position information in the first direction,
   wherein the sensor includes a first reader and a second reader disposed with an interval therebetween in the first direction and each configured to read the first pattern, and
   wherein the encoder further comprises:

a first position acquirer configured to acquire a first position in the first direction by using an output signal from the first reader reading the first pattern and to acquire a second position in the first direction by using an output signal from the second reader reading the first pattern;

a period acquirer configured to acquire a period of the first pattern by using the first and second positions;

a second position acquirer configured to acquire a first shift amount that is a relative positional shift amount between the scale and the first reader in a second direction orthogonal to the first direction and acquire a second shift amount that is a relative positional shift amount between the scale and the second reader in the second direction; and a position information producer configured to acquire, by using the first and second shift amounts, (a) a first tilt angle of a direction connecting positions at which the first and second readers read the first pattern relative to the first direction and (b) a second tilt angle of a periodic direction of the first pattern relative to the first direction, and to produce the position information by using the first and second positions, the period and the first and second tilt angles.

2. An encoder according to claim 1, further comprising an angle acquirer configured to acquire, by using the first and second shift amounts, the first tilt angle of the direction connecting position at which the first and second readers read the first pattern relative to the first direction, wherein the position information producer produces the position information by using the first and second positions, the period, the first tilt angle and the first or second shift amount.

3. An encoder according to claim 1, wherein the scale is provided with a second pattern different from the first pattern, and wherein the second position acquirer acquires the first and second shift amounts by using output signals from the first and second readers reading the second pattern.

4. An encoder according to claim 1, wherein the second position acquirer is constituted by a measurer configured to measure, at mutually different positions in the first direction, a position of a reference plane of the sensor in the second direction.

5. An apparatus comprising:

a movable object;

an encoder configured to produce position information of the movable object; and a controller configured to control movement of the movable object by using the position information, the encoder comprising:

a scale; and a sensor, the scale and the sensor being movable relative to each other in a first direction, the sensor being configured to read a first pattern as a periodic pattern provided to the scale to produce position information in the first direction, wherein the sensor includes a first reader and a second reader disposed with an interval therebetween in the first direction and each configured to read the first pattern, and wherein the encoder further comprises:

a first position acquirer configured to acquire a first position in the first direction by using an output signal from the first reader reading the first pattern and to acquire a second position in the first direction by using an output signal from the second reader reading the first pattern;

a period acquirer configured to acquire a period of the first pattern by using the first and second positions;

a second position acquirer configured to acquire a first shift amount that is a relative positional shift amount between the scale and the first reader in a second direction orthogonal to the first direction and acquire a second shift amount that is a relative positional shift amount between the scale and the second reader in the second direction; and a position information producer configured to acquire, by using the first and second shift amounts, (a) a first tilt angle of a direction connecting positions at which the first and second readers read the first pattern relative to the first direction and (b) a second tilt angle of a periodic direction of the first pattern relative to the first direction, and to produce the position information by using the first and second positions, the period and the first and second tilt angles.

* * * * *